July 21, 1964  YUKIO TANAKA  3,141,918
ZONE TEMPERATURE CONTROLLED BATH FURNACE
Filed April 20, 1961

United States Patent Office 3,141,918
Patented July 21, 1964

3,141,918
ZONE TEMPERATURE CONTROLLED
BATH FURNACE
Yukio Tanaka, Tokyo-to, Japan, assignor to Kokusai Denki Kabushiki Kaisha, Tokyo-to, Japan, a joint-stock company of Japan
Filed Apr. 20, 1961, Ser. No. 104,454
Claims priority, application Japan Apr. 21, 1960
1 Claim. (Cl. 13—24)

The present invention relates to a system for automatically controlling the temperature in an electric bath.

It is the principal object of this invention to provide an automatic temperature controlling system which is simple in construction and can unify the temperature of a salt material in an electric bath over all zones thereof, said bath being a main member of an electric bath furnace such as salt bath furnace or fluidal carbon electric bath furnace.

Figure 1:
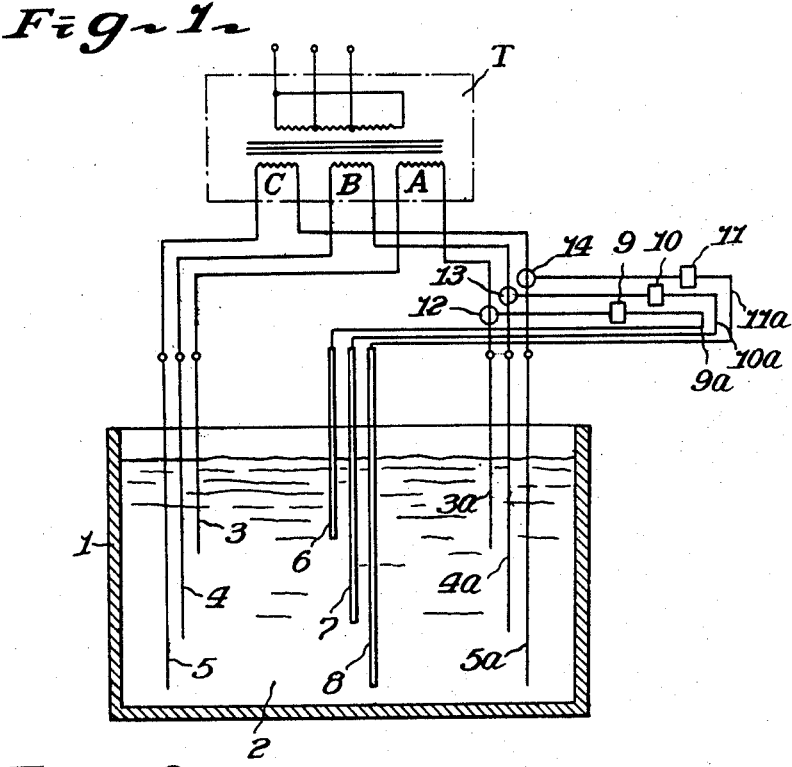
Figure 2:
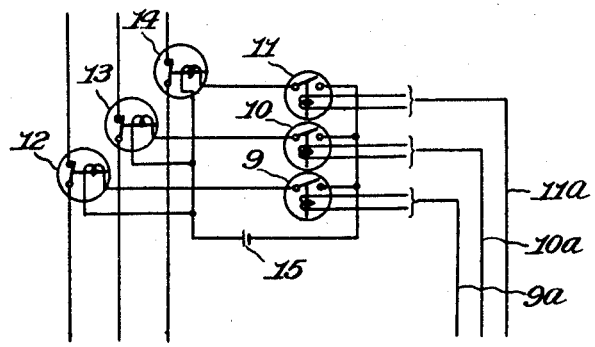

Said and other objects and advantages of the present invention will be understood more fully from a consideration of the following detailed description, taken in conjunction with one example illustrated in the accompanying drawing, in which the same members are indicated by the same numerals and in which:

FIG. 1 is a schematic connection diagram of one embodiment of this invention; and FIG. 2 is a connection diagram for illustrating the control relay members in the embodiment of FIG. 1.

Referring to FIGS. 1 and 2, an electrode group consisting of three electrodes 3, 4 and 5 and another electrode group consisting of three electrodes 3a, 4a and 5a are arranged opposite to each other at the both sides of an electric bath 2 in a chamber 1, said electrodes of each group being spaced from each other and their depths being made different. Three elecrode pairs (3, 3a), (4, 4a), and 5, 5a) are connected, respectively, to three secondary coils A, B and C of a three phase transformer T. Three thermocouples 6, 7 and 8 are provided in the electrolyte bath 2 at the depths corresponding, respectively, to the above-mentioned three electrodes pairs. Said thermo-couples are connected, respectively, to the temperature control relay members 9, 10 and 11 each of which is operated in response to the electric voltage induced in its corresponding thermo-couple. In the circuits of the secondary coils A, B and C are inserted, respectively, electromagnetic switches 12, 13 and 14 the energizing coils of which are so connected, respectively, to the temperature control relay members 9, 10 and 11 as shown more particularly in FIG. 2 that they are opened when their respective relay members are operated, each of the energizing coils of said switches 12, 13 and 14 being connected to respective control relay member through a common direct current source 15. However, each of said energizing coils may be connected to respective independent current source.

The operation of the embodiment as shown in FIGS. 1 and 2 is as follows.

When a three phase electric power source not shown is applied to the primary coils of the transformer T in the closed states of the switches 12, 13 and 14, a current passes through the passage between two opposing electrodes of each pair (3 and 3a), (4 and 4a) or (5 and 5a) through the electric bath 2. For example, if an electric current passes through passage between the electrodes 3 and 3a, the salt material in said passage is heated, thus enabling temperature measuring at said passage by the thermo-couple 6. Upon the rise of said temperature to a predetermined value, the relay member 9 is operated, thus causing opening of the switch 12, whereby the circuit of the electrodes 3 and 3a is opened. On the other hand, if said temperature is going down to said predetermined value, the switch 12 is closed again, whereby the circuit of the electrodes 3 and 3a is closed and heating of the salt material commences. Similarly, in connection with other electrode pairs (4, 4a) and (5, 5a), temperature controls are automatically carried out at the salt material zones corresponding to said electrode pairs and (5, 5a). According to the above-mentioned operation, the temperature of the salt material in the bath 2 can be unified over all zones such as upper intermediate and lower zones.

The embodiment of FIGS. 1 and 2 relates to the case wherein the electric bath is used as the three phase alternating current load. However, in general, this invention can be applied to the case wherein the electric bath is used as an n-phase alternating current load. In this case, the electric bath is divided into n-sections in the depth direction, and the same control as the embodiment of FIG. 1, is carried out in each of said sections. Furthermore, when the electric bath is used as a single phase current load, this invention can be embodied by use of a transformer provided with independent secondary coils which are grouped in the groups.

Actual Example 50 kg. of carbon powder of 80 mesh fineness were charged into a chamber of 100 cm. x 48 cm. x 60 cm. (depth) and 0.2 kg./cm.² of air was blown per minute from the bottom of said chamber to fluidize said carbon powder. In said chamber, when an electric voltage (200 v. and 50 cycle) was applied to each pair of two opposing electrodes made of stainless steel plate which were arranged as shown in FIG. 1, a current of 100 amperes passed through the electrodes of each pair while maintaining the carbon particles at a temperature of 800° C. However, the temperature of the fluidized carbon particles differed depending upon the depth of said particles. For example, the upper, intermediate and lower zones became, respectively, 770° C., 830° C. and 900° C. In such a case as described above, the temperatures at all zones can be effectively maintained at about 800° C. by the system of this invention. In this example, distances between the electrodes 3 and 3a, 4 and 4a, and 5 and 5a were selected to be 50 cm., 55 cm. and 60 cm., respectively.

What I claim is:

Apparatus for automatically controlling the temperature of a salt or carbon electrolyte bath furnace comprising, in combination, a plurality of sets of electrodes in said bath furnaces, the electrodes of one set being paired in operation with corresponding electrodes in another of said sets, the sets of electrodes being disposed in spaced apart areas of said bath, each electrode of each of said sets being disposed at a depth in the bath of the furnace different from the depth of the remaining electrodes of a respective set, the electrodes of each pair of the sets being disposed substantially at a common depth and spaced relative to each other, a source of electrical potential, connections for applying electrical potential to each pair of electrodes to cause said bath to be heated uniformly, temperature-responsive devices disposed in said bath intermediate said sets of electrodes sensing the temperature of the bath at respective zones aubstantially corresponding to the different depths heated by respective pairs of said electrodes, said temperature-responsive means comprising thermocouples, for generating current of variable intensity in dependence upon the temperature intensity of the zones of said bath and thereby representative of the temperature intensities of the respective zones being sensed by the individual thermocouples, current-responsive relays having operating coils connected directly to respective ones of said temperature-responsive means, and electromagnetic switches having coils the energization of which is controlled by said current-responsive relays to open and close said connections to said supply source to automatically de-energize and energize respective pairs of said electrodes in said sets when the temperature in a given zone exceeds or is less than a predetermined temperature value and said relays being connected to energize said coils of said switches to open said switches when said relay coils are energized.

References Cited in the file of this patent

UNITED STATES PATENTS

| | | |
|---|---|---|
| 764,592 | Johnson | July 12, 1904 |
| 1,670,846 | Cope | May 22, 1928 |
| 1,985,967 | Wunsch | Jan. 1, 1935 |
| 2,145,677 | Adam | Jan. 31, 1939 |
| 2,158,135 | MacFarlane | May 16, 1939 |
| 2,158,136 | MacFarlane | May 16, 1939 |
| 2,350,734 | Dumarest | June 6, 1944 |
| 2,354,753 | Holden | Aug. 1, 1944 |
| 2,421,224 | Solakian et al. | May 27, 1947 |
| 2,508,004 | Adam | May 16, 1950 |
| 3,086,385 | Branchereau et al. | Apr. 23, 1963 |

FOREIGN PATENTS

| | | |
|---|---|---|
| 890,371 | France | Nov. 2, 1943 |